July 28, 1936.  T. J. KIDD  2,048,746

SEPARATOR

Filed April 24, 1934   2 Sheets-Sheet 1

INVENTOR
Thomas J. Kidd
BY
Charles H. Bassett
ATTORNEY

July 28, 1936.  T. J. KIDD  2,048,746
SEPARATOR
Filed April 24, 1934   2 Sheets-Sheet 2
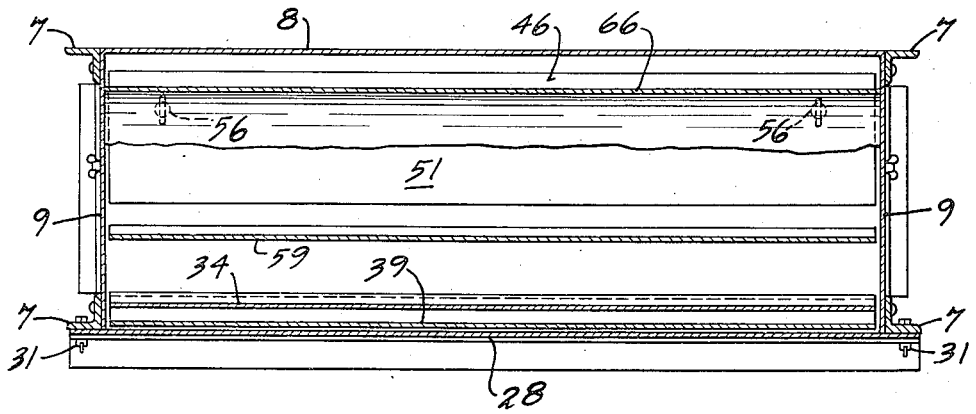
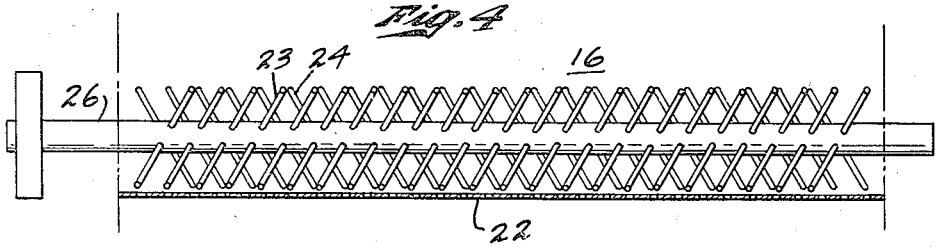
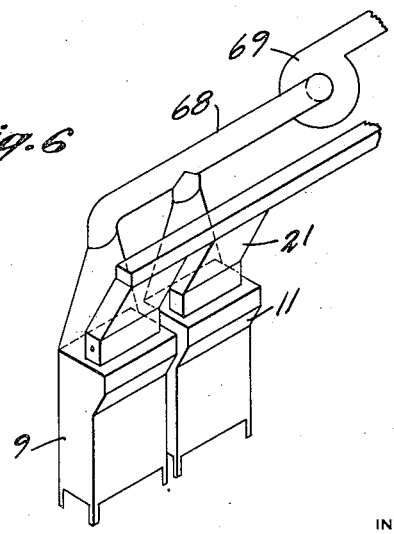
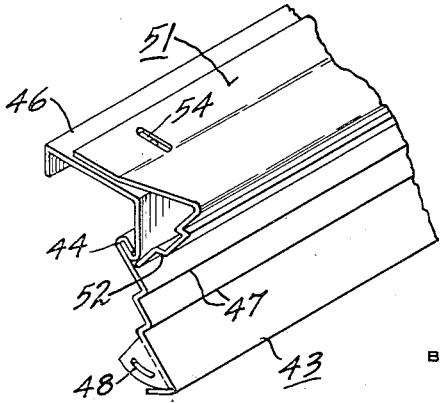
INVENTOR
Thomas J. Kidd
BY
Charles H. Bassett
ATTORNEY Patented July 28, 1936

2,048,746

UNITED STATES PATENT OFFICE 2,048,746

SEPARATOR

Thomas J. Kidd, Birmingham, Ala.

Application April 24, 1934, Serial No. 722,154

6 Claims. (Cl. 209—133)

My invention relates to separators and, more particularly, to apparatus for separating cotton seed hulls from cotton seeds and seed meats; and has for an object the provision of a device which is simple in design and embodying a minimum number of moving parts.

My invention contemplates the provision of a device in which the material to be separated is agitated and then disseminated as it enters the separator; after which, the material moves by gravity downwardly, or carried by a current of air, if desirable, and is directed laterally towards an impact plate where the separation is caused to take place by means of an ascending current of air, the hulls being entrained in the ascending current of air and the seeds and loose meats fall by gravity into a conveyer trough.

My invention further contemplates the provision of an improved impact plate having projecting shoulders which serve to obstruct an ascent of material heavier than seed hulls; and also contemplates an auxiliary impact plate which extends upwardly and outwardly at an angle from the impact plate, and which is also provided with projecting shoulders adapted to obstruct an upward movement of heavy material.

My invention also contemplates the provision of means for adjusting the impact plate and the auxiliary impact plate angularly with respect to each other, and also with respect to the line of travel of the material being discharged towards the impact plate. By adjusting the angles and positions of these plates, it is possible to adapt this machine for use in the separation of many materials other than those hereinbefore mentioned.

Briefly, my invention comprises a collector chamber provided with an inlet and an outlet for material to be separated. Mounted for rotation in the inlet opening, I have provided means for agitating the material to be separated, and means for disseminating same through a screen. As the material descends through the collector chamber, it is caused to pass through a comparatively small outlet opening provided with a deflector blade which directs the material laterally towards an impact plate. A passageway is provided between the outlet opening and the impact plate for an ascending current of air which acts to separate the hulls from the seeds and meats; the light cotton seed hulls pass upwardly entrained in the current of air, and the seeds and meats descend into a trough conveyer. In order to prevent an upward travel of material having a higher specific gravity than the hulls, I have provided a plurality of shoulders which project outwardly from the face of the impact plate. Projecting outwardly at an angle from the upper end of the impact plate, I have provided an auxiliary impact plate which is also provided with shoulders to obstruct an upward travel of heavy material. The impact plate and the auxiliary impact plate are both adjustable to effect a separation of various materials. A material feed regulator is provided in the collector chamber outlet to vary the size of this opening; and an air regulator is pivotally mounted in spaced relation to the auxiliary impact plate to provide an adjustable air inlet leading to the air passageway. As it is desirable under certain conditions to admit air into the upper part of the collector chamber, I have provided a door which affords a variable opening, and which also permits access to the screen for cleaning same when necessary.

Apparatus embodying features of my invention is illustrated in the accompanying drawings forming part of this application, in which;

Fig. 3 is a sectional view taken along the line III—III of Fig. 2;

Fig. 4 is a detail view of the agitator and disseminating screen provided in the inlet opening leading to the interior of the separator;

Fig. 5 is a fragmentary perspective view of my improved impact blade and auxiliary impact blade; and Fig. 6 is a perspective view of a pair of separators.

Figure 1:
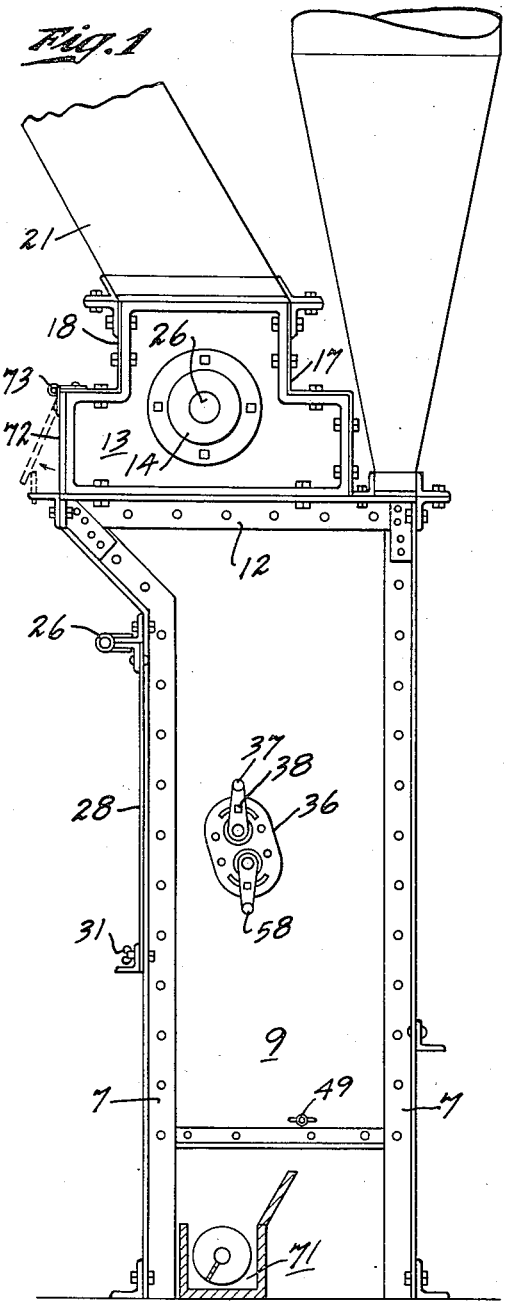
Fig. 1 is a side elevational view of my improved separator.

Referring now to the drawings for a better understanding of my invention, I show a separator having angle iron corner posts 7, a back wall 8, side walls 9, and a front wall 11. A marginal frame 12 formed of angle iron is secured to the upper end of the posts 7, and has secured thereto a pair of bearing frames 13 provided with bearings 14 to receive for rotation therein an agitator 16. The bearing frames 13 carry a back plate 17 and a front plate 18 to provide an agitator chamber 19; into which, material to be separated is delivered by means of a chute 21.

Figure 2:
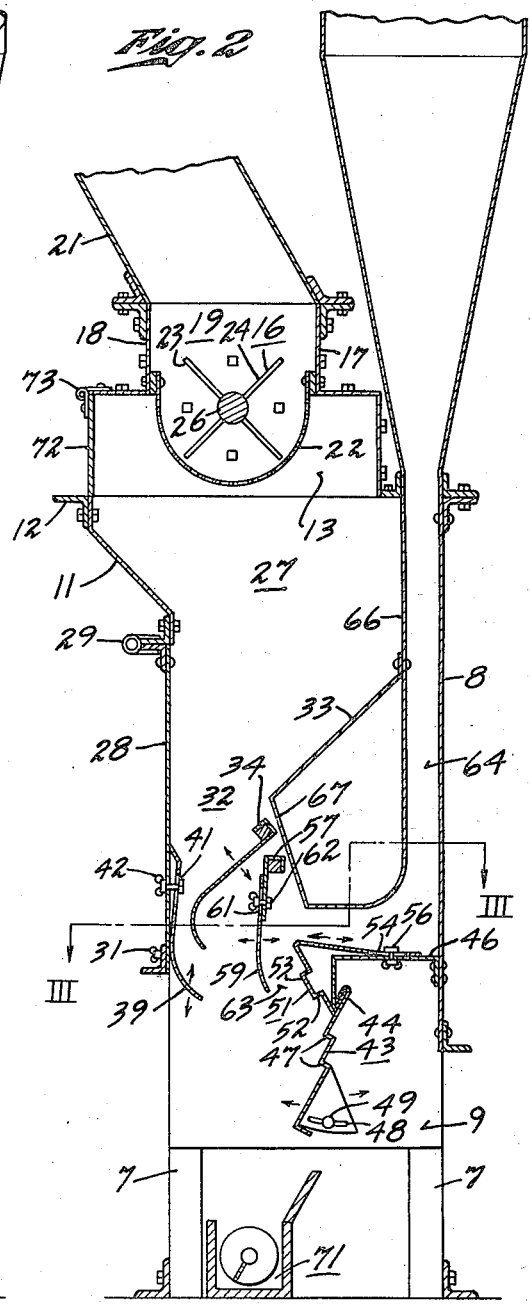
Fig. 2 is a transverse sectional view of the separator.

Extending the width of the agitator chamber and secured to the front plate 18 and back plate 17, I have provided a screen 22 above which the material is constantly agitated by means of a plurality of sets of arms 23 and 24 mounted on the agitator shaft 26. As shown in Figs. 2 and 4, the agitator is provided with four sets of arms; the arms 23 lean in one direction and the arms 24 lean in an opposite direction to more effectively agitate the material within the agitator chamber 19, and cause it to pass through the openings in the screen 22 into a collecting chamber 27.

The collector chamber 27 is defined by the back wall 8, side walls 9, front wall 11, and a door 28; the door 28 is pivotally connected at 29 to the lower edge of the front wall 11, and is secured, in closed position, to the corner posts 7 by means of a pair of bolts 31. A trough shaped outlet 32 is formed at the bottom of the collector chamber by means of a downwardly inclined partition 33 and a material regulator 34. The material regulator is pivotally mounted in end bearings 36 secured to the side walls 9, and provided with a lever 37 to vary the size of the outlet 32; and suitable means, such as a set screw 38, is provided on the lever 37 for engagement with the end bearings 36 to prevent accidental displacement of the regulator after it has been adjusted.

Secured to the inner side of the door 28 and below the outlet 32, I have provided an adjustable deflector 39 which is slotted at 41 to receive bolts 42. The deflector is adapted to direct the material laterally towards an impact plate 43 which is pivotally mounted at 44 on a bracket 46 secured to the back wall 8. The impact plate is formed with downwardly facing shoulders 47 which act to obstruct an upward movement of material heavier than cotton seed hulls, as hereinafter described; and the plate is slotted at 48 to receive a lock bolt 49 for adjusting the plate angularly.

An auxiliary impact plate 51 is provided above the impact plate 43, and is formed with one or more downwardly facing shoulders 52 which act to obstruct an upward movement of relatively heavy material, such as cotton seeds. The auxiliary impact plate is provided with a front face portion 53 which projects upwardly and outwardly at an angle from the upper end of the impact plate 43; and then extends rearwardly for engagement with the bracket 46. In order to provide for an angular adjustment of the auxiliary impact plate, I have slotted the plate at 54 to receive a bolt 56 which extends through the bracket.

Positioned in front of the auxiliary impact plate, I provide an air regulator 57 which is pivotally mounted in the end bearings 36, and adjustable angularly by means of the lever 58. The regulator carries a plate 59 which is slotted at 61 for vertical adjustment by loosening the bolt 62. The auxiliary impact plate and the regulator form an inlet 63 leading to an air passageway 64 which extends upwardy and over the auxiliary impact plate, and then upwardly between the back wall 8 and a partition 66. As shown in the drawings, the partition 66 and the inclined partition 33 are formed in one piece by providing the connecting wall 67. The air passageway leads upwardly through a conduit 68 to a fan 69.

In the operation of my improved separator, the material to be separated is supplied through the feed chute 21 to the agitator chamber 19, where it is agitated by the arms 23 and 24 until it passes through the screen 22 into the collector chamber 27. The material leaves the chamber through the outlet 32, and is directed laterally towards the impact plate 43 by means of the deflector 39.

Before the material can come into contact with the impact plate, it must pass through a current of air. The air enters at the bottom of the machine, and is drawn upwardly in front of the impact plate and the auxiliary impact plate, and through the passageway 64 by the fan 69. When the material enters the air stream, the cotton seed hulls are carried upwardly and out of the machine through the passageway 64; and the heavier materials such as cotton seeds and loose meats, have sufficient weight and velocity to move through the stream of air into contact with either the impact plate 43 or the auxiliary impact plate 51.

Due to the shoulders provided on the impact plates 43 and 51, the velocity of the ascending stream of air is retarded adjacent the faces of the plates; and relatively heavy material, such as seeds will not be lifted by the stream of air, but will fall by gravity into a trough conveyer 71.

It has been found to be desirable under certain conditions of operation to open the door 72, which is pivotally connected at 73 to the front plate 18. By doing so, air is admitted into the collector chamber and acts to increase the velocity of the material passing therethrough.

By adjusting the positions of the deflector 39, material regulator 34, air regulator 57 and door 72, and the impact plates 43 and 51, it is obvious that this machine can be employed in the separation of many different materials; and that it will operate over long periods of time without requiring attention, or repairs.

While I have shown my invention in but one form, it is obvious to those skilled in the art that it is not so limited, but is susceptible of various changes and modifications without departing from the spirit thereof; and I desire, therefore, that only such limitations shall be placed thereupon as are imposed by the prior art.

What I claim is:

1. In a separator, a collector chamber, means for feeding material downwardly through said collector chamber, an impact plate disposed in substantially vertical plane below the collector chamber, a deflector for directing an unobstructed flow of material passing from the collector chamber towards said impact plate, means producing an upwardly flowing current of air between the material directing means and the impact plate, and downwardly facing shoulders provided on the face of the impact plate for obstructing an upward movement of relatively heavy material.

2. A device according to claim 1 in which, an air inlet is provided near the upper end of the collector chamber to increase the velocity of the material passing downwardly through the collector chamber.

3. A device according to claim 1 in which, means are provided for changing the relative positions of the deflector and the impact plate.

4. A device according to claim 1 in which, means are provided for varying the density of the material flowing past the material deflecting means.

5. In a separator, a collector chamber, means for feeding material downwardly through said collector chamber, an impact plate disposed in a substantially vertical plane below the collector chamber, an auxiliary impact plate positioned above said impact plate and projecting upwardly and outwardly from the face thereof, a deflector for directing an unobstructed flow of material passing from the collector chamber towards the impact plate, an air regulator plate positioned between the deflector and the auxiliary impact plate and forming therewith an air passageway extending upwardly between the air regulator plate and the auxiliary impact plate, and means for producing an upwardly flowing current of air through the passageway formed by the air regulator plate and the auxiliary impact plate.

6. A device according to claim 5 in which, downwardly facing shoulders are provided on the face of the impact plate for obstructing an upward movement of relatively heavy material.

THOMAS J. KIDD.